(12) United States Patent
Beeler

(10) Patent No.: US 9,492,755 B2
(45) Date of Patent: Nov. 15, 2016

(54) METHOD FOR GUIDING GAMEPLAY OF PLAYERS PARTICIPATING IN A COMPUTER-IMPLEMENTED VIRTUAL GAME

(71) Applicant: Jeff A. Beeler, Chicago, IL (US)

(72) Inventor: Jeff A. Beeler, Chicago, IL (US)

( * ) Notice: Subject to any disclaimer, the term of this patent is extended or adjusted under 35 U.S.C. 154(b) by 672 days.

(21) Appl. No.: 13/737,829

(22) Filed: Jan. 9, 2013

(65) Prior Publication Data

US 2013/0231189 A1 Sep. 5, 2013

Related U.S. Application Data

(60) Provisional application No. 61/584,795, filed on Jan. 9, 2012.

(51) Int. Cl.
*A63F 13/35* (2014.01)
*A63F 13/79* (2014.01)
*A63F 13/65* (2014.01)

(52) U.S. Cl.
CPC ............... *A63F 13/79* (2014.09); *A63F 13/35* (2014.09); *A63F 13/65* (2014.09)

(58) Field of Classification Search
USPC .......................................... 463/31
See application file for complete search history.

(56) References Cited

U.S. PATENT DOCUMENTS

| 2009/0163275 A1* | 6/2009 | Ishii et al. ........................ 463/31 |
| 2010/0069152 A1* | 3/2010 | Nishimura et al. ............. 463/31 |
| 2013/0005480 A1* | 1/2013 | Bethke .................... A63F 13/10 463/42 |

* cited by examiner

*Primary Examiner* — Dmitry Suhol
*Assistant Examiner* — Ankit Doshi
(74) *Attorney, Agent, or Firm* — Quarles & Brady LLP

(57) ABSTRACT

A method for guiding gameplay of players participating in a computer-implemented virtual game is disclosed. The method comprises the steps of determining a population contingency, identifying a reference distribution parameter in connection with the population contingency, and using at least one processor to construct a linking function based on a comparison between a player action and the reference distribution parameter. The method further includes the steps of storing game data in a data storage system, wherein the game data includes at least one or more of the population contingency, the reference distribution parameter, and the linking function, and facilitating the exchange of game data between an individual player and the data storage system.

20 Claims, 18 Drawing Sheets

"X" = player action or game event
"A" = outcome or resolution

FIG. 1B

| TYPE | Qty. | Current Unit value | Current Value | TOTAL COST | | |
|---|---|---|---|---|---|---|
| SIAMESE | 1 | $3.00 | $3.00 | $4.50 | BUY MORE | SELL |
| EGYPTIAN | 2 | $40.00 | $80.00 | $30.00 | BUY MORE | SELL |
| OCELOT | 1 | $90.00 | $95.00 | $89.00 | BUY MORE | SELL |
| TABBY | 0 | | | | | |
| | | | Total Current Value 348.00 | | | |
| | | | 82% | PORTFOLIO RANK (Percentile) | | |

PORTFOLIO — 200
CATS
BANK — 206
Available CASH $64222

204 (SELL)
202 (BUY MORE)
208 (Total Current Value)
210 (PORTFOLIO RANK)

Figure 2

$$X \longrightarrow f(x_n, y_n) \longrightarrow A$$

X = action/event in individual gameplay to be evaluated and resolved

Xn = *individual player related input(s)*

Yn = *reference distribution/statistic*; aggregate player population data used in outcome determination f(xn, yn) = *linking function* defining relationship between individual player input Xn and aggregate population data Yn

A = outcome of action/event in individual gameplay

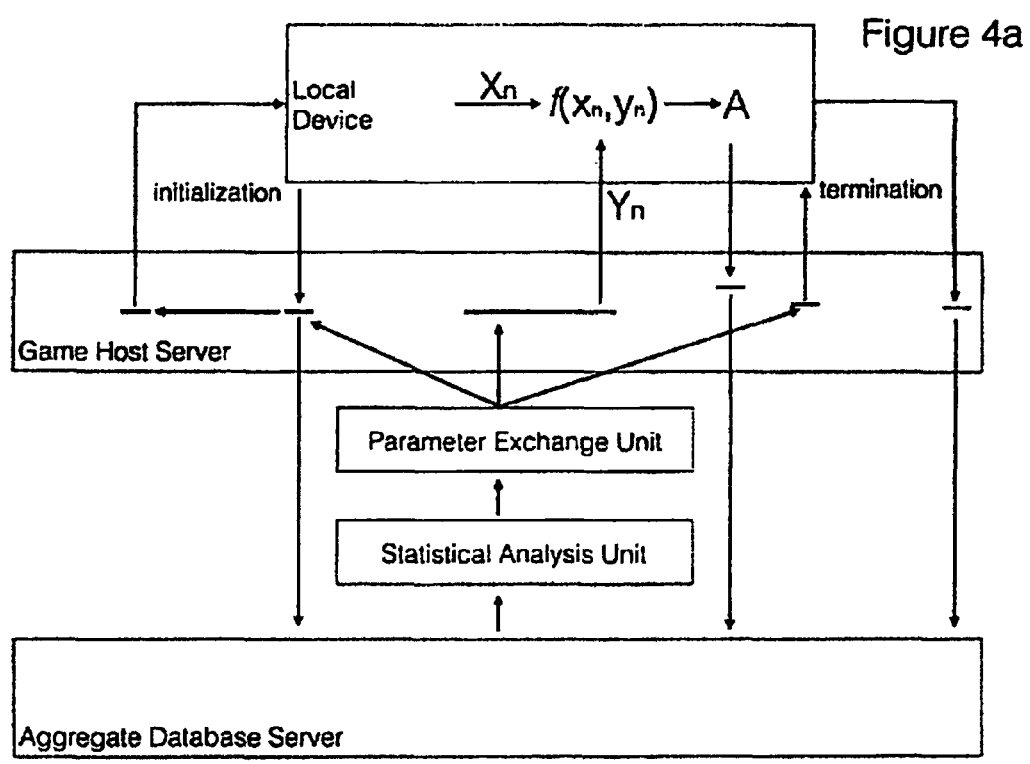

* from cached values on game host server or query of parameter exchange unit. Fig5

* from cached values on game host server or query of parameter exchange unit unit, Fig5

Figure 9

PLAYER ACTION MENUS:

PLAN CAMPAIGN
(player responses):

- Quotes
- Poll questions
- Video clips
- Positions
- Proposals

FUND-RAISING:

- Host dinner
- Gala event
- Direct mail
- Telephone solicitation
- Internet appeal
- Tap social network

CAMPAIGNING:

- Stump speech
- Radio advert
- Television advert
- Internet advert
- Talk show
- Comedy show
- Press conference
- Media query
- Debate
- Position statement
- YouTube video
- Quip
- Response statement

MECHANICS: Meters/Indicators
PLAYER
FUNDS: $$$
PLAYER
LEVEL: Local/Regional/National
PLAYER POPULARITY
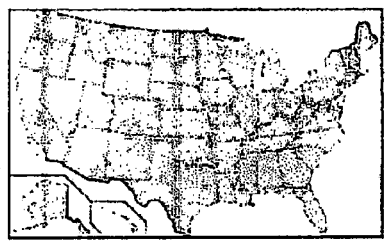
Figure 10
PLAYER VISIBILITY
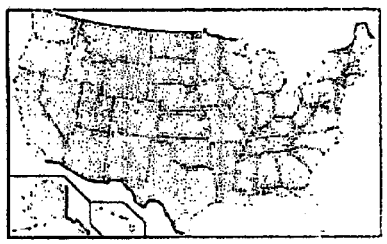
PLAYER RANK
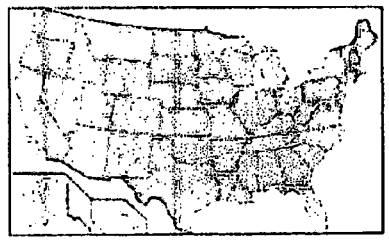

METHOD FOR GUIDING GAMEPLAY OF PLAYERS PARTICIPATING IN A COMPUTER-IMPLEMENTED VIRTUAL GAME

CROSS REFERENCE TO RELATED APPLICATIONS

This application claims the benefit of U.S. Provisional Patent Application Ser. No. 61/584,795, filed on Jan. 9, 2012.

REFERENCE REGARDING FEDERALLY SPONSORED RESEARCH OR DEVELOPMENT

Not applicable.

SEQUENTIAL LISTING

Not applicable.

BACKGROUND OF THE INVENTION

1. Field of the Invention

The present disclosure relates generally to online computerized games, and more particularly, to online computerized games having a population of players whereby at least one action or event in the computerized game is determined through a population contingency evaluation process.

2. Description of the Background of the Invention

Online computerized games have been known for some time. Various known games include pre-programmed gameplay outcomes. For example, if the player moves left rather than right at a certain point in the game, the program may be designed to "kill" the player. Other games might have gameplay outcomes determined by chance, such as online poker games or other gambling games.

With many games, players may become bored with the game over time as they become familiar with their various gameplay decisions and the typical outcomes associated with those decisions. In this regard, there is a strong ongoing desire for computerized games that stimulate players' interest.

Computerized games are often available on social networking applications. There are a variety of useful hardware, CPU's, or other electronic devices that allow users to use such applications, including, for example, Gilbert et al. U.S. Patent Application Publication No. 2011/0167115, filed Dec. 22, 2010, and incorporated by reference in its entirety for all purposes as if fully disclosed herein. Online computerized games operating within a social media environment may be particularly attractive to a variety of players.

The methods disclosed herein solve the aforementioned drawbacks associated with pre-programmed or chance based games. Accordingly, the method disclosed herein utilizes a game having one or more of an individual player's gameplay outcomes determined by regularly updating statistical data from a population of players within the game.

In one or more embodiments, if a player takes a particular action in the game, the favorability of that action is evaluated by comparison to actions from other players within the game (i.e., the player population).

In one or more embodiments, an individual player's action in a game, involves the individual player taking a position on an issue, e.g., choosing a green monster avatar or a brown monster avatar, and the popularity of the position is evaluated, and/or perhaps scored or ranked by evaluating player population data of player preferences within the player population on that issue at that point in time. Therefore, if a choice of the green monster avatar were more popular in the player population at that time, then such choice might result in higher points to the individual player.

One additional advantage of making gameplay outcome determined by updating player population data is that the game may evolve and change over time as the player populations' actions or preferences change over time. For example, the brown monster avatar selection might become more popular than selecting the green monster avatar after a certain amount of time of gameplay. Therefore, an individual player who recalls that selecting the green monster avatar was popular previously may be surprised to find that the trend has shifted after selecting the now less popular green avatar.

Making gameplay outcome dependent on player population data also provides a significant advantage to various parties interested in studying the data generated by the game. For example, a stuffed animal manufacturer might study popularity data of various monster colors in choosing which color of stuffed monster to sell in retail stores.

Here, numerous methods are described to establish a method and process by which the aggregate play of all players playing a game can be used to establish population 'norms' which can be used to make the outcome of events/actions taken during game play by individuals contingent upon aggregate characteristics of all players playing the game. The aggregation of data in this manner allows the creation of games that change and evolve unpredictably over time, rather than merely preprogramming a single set of game contingencies that players learn, habituate to, and become bored with.

Many types of virtual games may implement the methods and processes described herein. For example, the methods described herein may be suitable for use in an economic based game. Players have to choose an item to produce and, rather than the 'sale price' for each item being pre-preprogrammed, the sale price is determined based on the aggregate number of players choosing to produce the particular item. So, if one product is initially valuable, more players will choose to make it, thereby decreasing its value. This, in turn, will cause fewer players to choose making it, subsequently enhancing its value as it again becomes more scarce in the virtual game world. This gameplay outcome, i.e., the current value of each item, may be achieved by using a programmed linking function, such as perhaps a suitable frequency function, which assesses supply and demand based on the relative quantities of each item the player population is producing at any given time.

A further example of a game suitable for use with the methods and processes described here is a game that is generated (e.g., "Life") where a player has to acquire employment. Typically, whether the player can acquire employment is programmed and determined by the player's experience points, achievement level, whether the player has met particular prerequisites, and so on. In a population contingency version of the game that utilizes the methods herein, whether the player acquires employment will be at least partially determined with respect to norms established through aggregate play of all players. So, for example, the clothes the player wears when applying for the job (i.e., clothing variable) may be evaluated against an aggregate game-play derived norm and either increase or decrease the likelihood of getting the job. Importantly, the clothing variable is not pre-programmed, but rather the relationship between aggregate data and the outcome of actions and events while an individual plays the game is determinative. For example, the popularity of a particular clothing item is not pre-programmed. Instead, a population of players at any given time may dictate a different popularity level for any particular clothing item. The process by which the game periodically collects population data to measure popularity of each clothing item, and the particular reference distribution derived from that collected data to measure the popularity of each item at a given time are the factors that are programmed. Virtually any type of game can be implemented with a population-contingency method, whether the coded relationships between aggregate data and game contingencies is explicit to the player or invisible.

In one embodiment, the game is bidirectional. In particular, information is gathered from users to compile aggregate population data, but, in turn, individual users are evaluated according to that population data, which then affects the outcome for that individual in a game environment.

Such population contingent games can be especially entertaining as more unpredictable and more dynamic than entirely pre-programmed games by using a population contingency process. The game may optionally allow new players to join after gameplay has started, which could be another factor changing population norms.

Population contingent games may be educational as well as entertaining. For example, the data generated within a public polling game could, in essence, provide a microcosm, and the norms and opinions derived from game data can provide potentially important public opinion data. For example, a city could be created in which there is conflict regarding administration of the school district. A game could be set up where players attempt to run the school district as they see fit. Each player's success in doing so, however, is determined by what all other players are doing. As players adjust their choices in response to other players, gradually a compromise solution garnering the greatest consensus will emerge. Data from this gameplay could perhaps be educational for training school administrators or could be used for other purposes.

Thus, though this disclosure describes a method and process for implementing population contingent games, the purpose and application of such games could have other value beyond being merely entertaining. Further, the methods disclosed herein could be utilized in other virtual contexts including on social media platforms, through cellular networks, or on any device that is connected to any other device (i.e., iPad to desktop computer, cellular phone to tablet computer, etc.).

SUMMARY OF THE INVENTION

According to one aspect of the invention, a method for guiding gameplay of players participating in a computer-implemented virtual game is disclosed. The method comprises the steps of determining a population contingency, identifying a reference distribution parameter in connection with the population contingency, and using at least one processor to construct a linking function based on a comparison between a player action and the reference distribution parameter. The method further includes the steps of storing game data in a data storage system, wherein the game data includes at least one or more of the population contingency, the reference distribution parameter, and the linking function, and facilitating the exchange of game data between an individual player and the data storage system.

According to another aspect of the invention, a computer implemented method for a game having at least one component that is outcome dependent on updating player population data is disclosed. The method includes the steps of establishing a population of players, collecting at least one element of player information from the population of players to compile aggregate player population data, wherein the game is hosted by a computer system that stores aggregate player population data in a data storage system. At least one statistical reference distribution is defined that is to be extracted from the aggregate population data and a linking function is constructed that determines the relationship between an individual player gameplay and the at least one reference distribution to determine at least one gameplay outcome of the individual player. The method further includes the steps of using at least one computer to apply the linking function and reference distribution to individual player gameplay to determine individual players' outcomes based on the aggregate population data, updating the aggregate population data and the at least one reference distribution for additional evaluations of successive player gameplay inputs, and using at least one screen to display at least one individual player gameplay outcome during the course of the game.

According to a different aspect of the invention, a system comprises at least one processor of a machine and a game networking system. The game networking system is configured to establish a population of players, query multiple players on a selected topic, and collect player responses to assemble aggregate response data. The game networking system is further configured to determine one or more statistical reference distributions to be extracted from the aggregate response data and define a linking function that determines the relationship between individual player input and the one or more reference distributions to determine at least one gameplay polling outcome of individual players. Further, the game networking system is configured to apply the linking function and reference distribution to individual player input to determine individual players' polling outcomes based on the aggregate response data, update the aggregate population data and associated reference distributions for successive evaluations of successive player inputs, and display at least one individual player gameplay polling outcome during the course of the polling game.

BRIEF DESCRIPTION OF THE DRAWINGS

FIG. 1B is a simplified user interface screen for use with the example game #1 that includes a table with rows omitted for ease of illustration;

FIG. 2 is a schematic representation of the concept of making action resolution a function of population norms;

FIGS. 4A and 4B each show a sample process strategy for computing population contingencies;

FIG. 9 illustrates various examples of types of player actions available in the example game;

FIG. 10 schematically illustrates mechanics of the example game;

DETAILED DESCRIPTION

Various methods are described herein that utilize a process by which the aggregate play of all players playing a game can be used to establish population 'norms' which can be used to make the outcome of events/actions taken during game play by individuals contingent upon aggregate characteristics of all players playing the game.

One or more of six major process steps, as described below, may be used in the method including the steps of identifying population contingencies, identifying reference distributions, constructing linking functions, establishing architecture for data collection, establishing operational procedures; returning information to the user.

Figure 1:
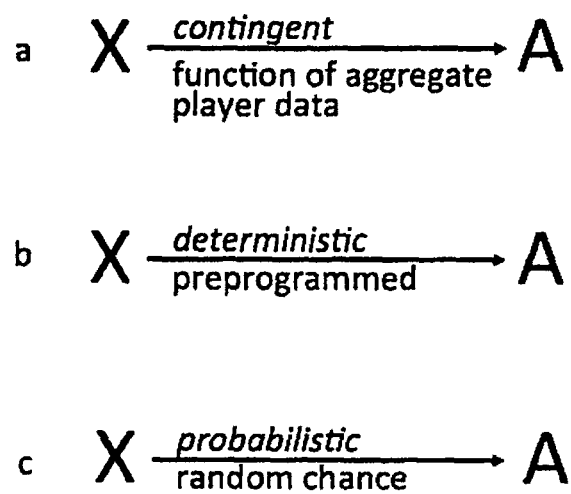
FIG. 1 is a schematic diagram of three mechanisms for resolving player actions.
Figure 1A:
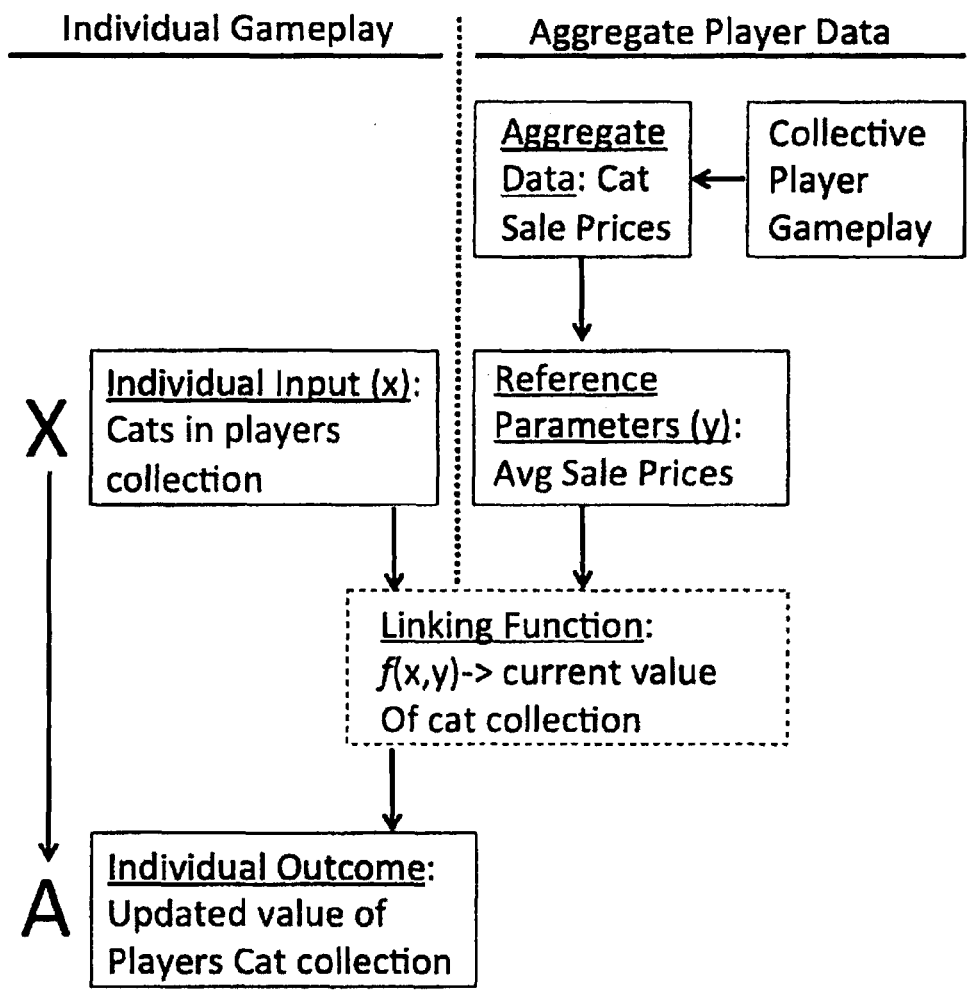
FIG. 1A is a schematic for an example game #1 according to one embodiment of the present invention.

With respect to FIG. 1, numerous methods may be used for resolving the outcome of a player's action: (a) a population contingency method proposed here, (b) a deterministically, pre-programmed method, and (c) a probabilistic method, with the latter two widely employed in current video game design. One step in the method disclosed herein is to identify actions and events within the game for which the outcome is to be determined through a population contingency evaluation process.

Figure 4B:
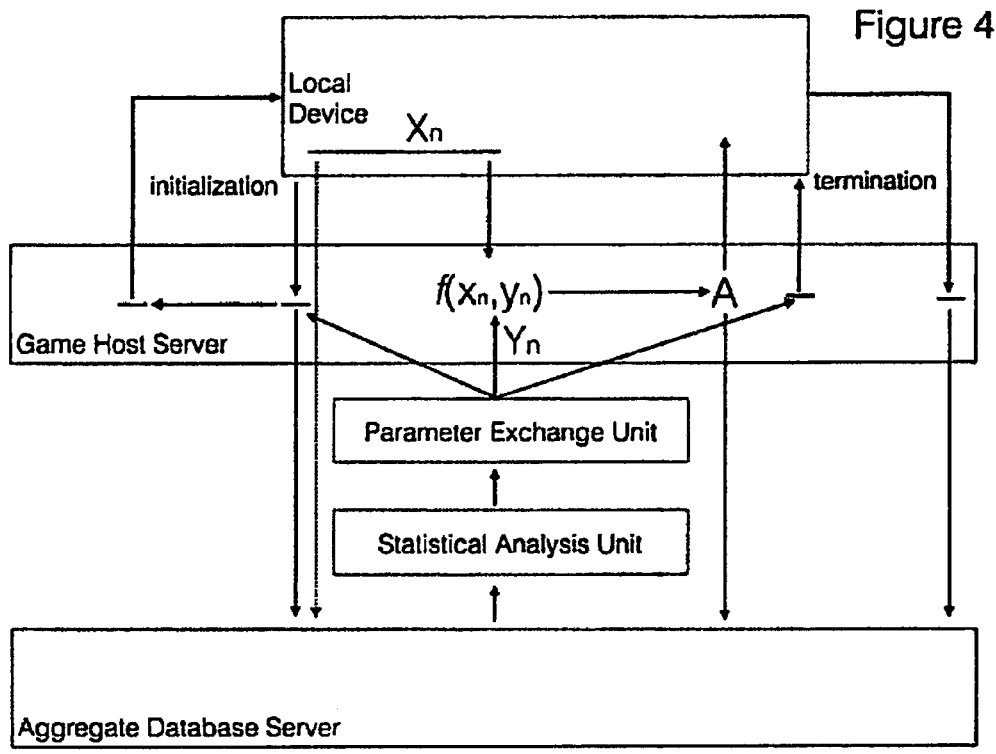

Defining a population contingency (See FIG. 2) includes the steps of (i) defining an input action/event in the game ("X" in FIG. 2), (ii) defining possible outcomes ("A" in FIG. 2), and (iii) defining a linking function that determines how aggregate player data is to be used to determine the outcome for a given action/event. Using previous examples, 'x' may be a player seeking employment, a player selecting a commodity to produce, or an event within the game, including those generated by the game independent of player action. For example, an event may be that a monster suddenly appears to challenge the player. Similarly, 'A' may be whether the player acquires employment, the return on the commodity the player selected, or the player's success in confronting the monster. In this process step, what must be determined is which game actions/events will be evaluated in this way and utilize the population contingency evaluation process. The relationship between the action/event and outcome, i.e., x→y, is determined by reference to aggregate population data of the game in the method steps discussed hereinbelow. FIGS. 4A and 4B depict two process strategies for computing population contingencies. In one embodiment depicted in FIG. 4A, a population contingency is evaluated on the local device of an individual player. In a different embodiment shown in FIG. 4B, evaluation of the population contingency evaluation takes place on the game host server.

An additional step used in the method herein includes the identification of reference distributions. In particular, for each population contingency, the aggregate player data that provides the population input required to resolve the contingency is identified and the aggregate data determines the outcome to at least one action or event. The selected data is defined in a specific mathematical and numerical form, which hereinafter is called a 'reference distribution.' The data may be structured and represented in a multitude of ways. For example, in one embodiment, the data may be represented as a gaussian distribution with a mean and standard deviation. In a different embodiment, the data may be structured as a frequency distribution. The exact structure or representation of the data depends on numerous factors including upon the data itself, as well as the use it is to be put to in the linking functions described below. Using the example of selecting a commodity to produce within the game, the relevant aggregate data is what commodities other players are selecting and the relative abundance or shortage of each particular commodity within the game world. For example, if the player opted to produce corn, the relevant data would be a measure of amount of corn produced as compared to the amount of total commodities produced by all players. If corn represents only 0.1% of the total, then corn is scarce and may be evaluated as valuable. If corn represents 90% of all production, then corn is plentiful and will be evaluated as devalued, returning little. Thus, the population data to be used in this example is a relative frequency distribution of all the commodities (i.e., for each commodity, what percentage of total production does it represent). In a different example, the player may have to take a quiz in order to achieve a result in the game (e.g., obtain an amount of magic). The player's performance on the quiz can be compared to a gaussian distribution (i.e., bell curve) of all players performance such that how much magic the player receives depends upon how many standard deviations the player is from the mean, analogous to grading 'under a curve' in schools. If the player is at the center of the bell curve, the player receives the average amount of magic. If the player is much higher or lower, the amount of magic the player obtains is scaled accordingly. In both examples, the aggregate population data to be used in determining a population contingency is selected. The form, structure, and representation of the population contingency is a reference distribution. Importantly, though in general it may be simpler to use a single reference distribution to resolve actions/events, it is possible that two or more reference distributions are used to resolve a single action.

Another step in the method described herein is that each contingency is resolved by a function that in some way compares the player action/game event to the selected population data, i.e., the reference distribution above. That is, the outcome of an action is determined by an equation or algorithm that evaluates the action in the context of the relevant population data. In general, there is a variable parameter drawn from the reference distribution, such as a mean and standard deviation, that is used in a formula that takes the player input (action/event) and calculates the outcome. For comparison to other, non-population contingent methods, consider a player action in a game where a player has to find and collect objects and then sell them for game cash. In a deterministic game, the value of objects the player chooses to sell is predetermined, e.g., every plowshare is worth 100 in-game coins. Alternatively, also frequently employed, the return may be determined probabilistically where the game software 'rolls a dice' (initiated in numerous ways) to determine how much coin the plowshare is worth. However, in a population contingency method, as described herein, the value of the plowshare is determined by aggregate population data in the game. As with the crop example above, the relevant information used for this example is how many plowshares players are finding and trying to sell. The value of plowshares may also depend upon their availability, their demand, or other game factors (e.g., if a plowshare was necessary to accomplish something in the game). So in this example, to determine the value of the plowshare the player is attempting to sell, the game could use two reference distributions: the mean and standard deviation of (a) the availability of various items for sale, and (b) the sale price. Assuming there are 30 objects that can be sold, in a specified period, 1213 of object A were sold, 567 of object B, 341 of object C and so on to the 30th object. These numbers could then be calculated into an average and standard deviation (e.g., pooling all objects sales together, average=754 per object and one standard deviation=+/−34 items). Similarly, the price for all objects sold could similarly be averaged to yield an average sale price, of, for example 120 coins. Using these distributions, one could calculate the yield on selling a plowshare as follows: take how much the sales of plowshares deviate from the mean (i.e., say 1.3 standard deviations) and apply that to the price distribution. In this way, if the plow share sales were 1.3 standard deviations LESS than the mean, then the player's price return would be calculated as 1.3 standard deviations MORE than the mean price of objects. The net result of this is that the sale price of plowshares will vary according to the overall sales and pricing of everything else in the game. If plowshares fetch a low price, then players will most likely seek and sell other more rare items and obtain greater cash. This, however, would shift the distributions as plowshares would then become more rare and fetch higher prices. In this way, the game continuously changes as players play and the aggregate data shifts.

The precise function and linkage to reference distribution(s) will vary according to the nature of the contingency being resolved and the factors contributing to resolution. To further the example above, a factor determining 'how many plowshares' will be in circulation for sale is how hard/easy the plowshares are to find. This factor can also be made population contingent. For example, imagine the player action 'looking under a rock.' In a deterministic game, the item that is to be found under that rock is already preprogrammed: e.g., a plowshare or candle. In a probabilistic game, the computer may 'roll a virtual dice' to decide if a plowshare or candle will be under the rock. In a population contingency game, the item that will be found under the rock can be determined probabilistically, in that the probabilities of a plowshare vs. a candle are weighted according to in-game information. Similar to calculating sale price previously herein, a reference distribution of 'how many plowshares are in the game compared to other objects' can be used to weight the 'dice roll.' That is, if there are lots of plowshares, then the chances of 'rolling a plowshare' under the rock can be weighed to be less while the candle can be weighed greater. This is roughly equivalent to increasing the number of sides on a die that says 'plowshare', which is going to increase the probability of finding a plowshare and increase the number of plowshares in the game. Notably, the method does not use probability or weighted probability, but rather the method uses player generated and thus collective/aggregate 'population' data, to determine the appropriate weighting, which is unique to the population contingency gaming described herein. Critically, the weights of a weighted probability will change as players collectively change their behaviors. It is also contemplated that the method described herein could incorporate various instances of probability or weighted probability so long as at least one or more weights of a weighted probability change in accordance with the principles described herein.

The examples above use statistics with a mean and standard deviation as reference distributions. However, various other forms of linking functions and variables from a reference distribution used in the function to resolve population contingencies are possible. For example, in one embodiment, resolving a contingency such as 'did I get the job' or 'did I kill the monster,' may be modeled with an inhomogeneous Poisson function. A poisson function describes a constant probability of an event. An inhomogeneous poisson has a 'variable constant probability' (i.e., the constant probability that defines the distribution changes over time where the parameter controlling the constant probability over time is called lambda). Using this type of function, whether the player acquires employment can be determined by drawing from a poisson distribution (constant probability) where the constant probability (i.e., lambda) is determined by population data. For example, the lambda could be a function of how many players within the game currently are employed. In this way, as more players find employment in the game, then the 'constant probability' of whether an individual player acquires employment when applying will be lowered (i.e., 'more difficult job market'). In a game, this can significantly change the game dynamics. For example, in a 'game of life' there might be little reason for players to not leave a job and seek a better one to advance in the game. In a population contingency version of the game, the degree to which it is a good idea to leave a job will depend upon how hard it is to get the next one, as described above. The difficulty of acquiring employment, in turn, will depend upon how, collectively, all of the players are playing the game.

In a different embodiment, another way to resolve population contingencies is through the use of simple correlations. For example, the correlation between players' gender and choosing an action could be used as a reference parameter to weight the outcome in contingency resolution according to a player's gender. Returning to the job scenario for example, when a particular job correlates highly with a particular gender, this information could be used to either weight success for or against the player depending upon whether or not the player is of the gender more correlated to that job (note, this is not to suggest this would be desirable, but rather is simply an example). Such correlational weighting will depend entirely upon on-going player activity in the game and the contingency functions may be as simple or as complex as necessary. For example, in another embodiment, more complex functions may be represented by a general linear model in which several variables contribute to the outcome. The model may have numerous factors A, B, and C (e.g., gender, experience points, amount of in-game coin) and the weighting of those factors (typically called beta weights in a regression) are drawn from aggregate population data. Noise may or may not be added into functions/models. A function or formula is mathematically defined that links the resolution of the population contingency to a reference distribution drawn from aggregate player generated data. Various suitable mathematical functions may be employed depending upon the characteristics and needs of the population contingency being evaluated.

Figure 3:
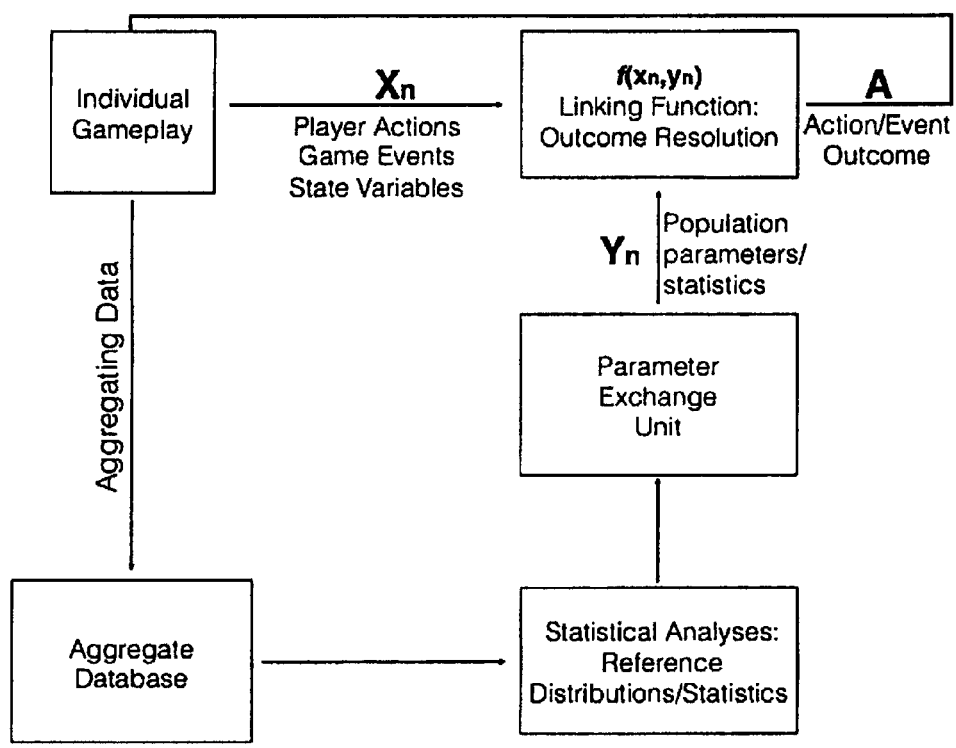
FIG. 3 is an overview of a sample population contingency architecture.

FIG. 3 illustrates an overview of a sample architecture that is useful in the method described herein. In particular, a further step utilized in the method herein includes establishing architecture for data collection, organization and analyses, and a system for parameter and variable exchange. A system should be established for facilitating exchange between aggregate data and individual play because aggregate player actions determine outcomes for individual play. Fundamentally, this requires two functionalities: (i) a data storage device and system that collects aggregate player data that is used to produce the aggregate reference distributions; and (ii) a repository of the reference distribution parameters (RDPs).

These two functionalities may be implemented differently according to the scale and scope of data to be collected and analyzed and according to the complexity of the analyses. For example, the reference distribution may be determined on-the-fly through queries of an aggregate database, or the RDPs may comprise a separate database that is updated at specified intervals (i.e., updated aggregate data re-analyzed) or some combination of the two. These two functionalities are identified hereafter as aggregate data, referring to the collection of raw player data and the parameter exchange unit (PEU), which relates to the variables and parameters drawn from the aggregate data and made available to resolve population contingencies upon demand. Aggregate data refers to any information obtained from players engaged in the game. In one embodiment, aggregate data includes player supplied information (e.g., age, gender, geographical location), and/or information queried from player in the course of the game (e.g., player rating of objects in games, peers, player answers to survey-like questions), and/or actions/choices made by players as well as the outcomes of player activities, and/or information on a population network, and/or characteristics of play, such as frequency, duration, time of day, etc. The aggregate player data encompasses all information that may be acquired from any aspect of player engagement with the game.

The format and method of aggregate player data storage will depend upon the scope and characteristics of the data. In one embodiment, the data may be stored in a large, unified relational database. In a different embodiment, the data may be stored in a series of smaller databases that are either sequentially or hierarchically organized. The method of transactions (i.e., input/output) is also dependent upon specific demands of the game and may range in sophistication from maintaining a socket connection on the player's console providing real-time, on-line transactions as game play proceeds to a simpler mechanism whereby player information from a session is recorded in a text log file that upon cessation of a session (or any specified portion of a session) is sent to the data center, parsed, and entered into aggregate storage off-line. The literal implementation of aggregate data storage and parameter exchange is flexible. A structured method for collecting, storing and analyzing the data required for reference distributions should be devised to ensure the proper flow of necessary data into a device that provides access to aggregate data from which the necessary parameters and variable information can be drawn in response to requests for resolution of population contingencies in the course of game play.

Once architecture is devised to support the collection, storage and analysis of aggregate data and generation of reference distributions, a process is established to (a) monitor and update reference distributions, and (b) access and utilize reference distribution parameters during game play.

Figure 5A:
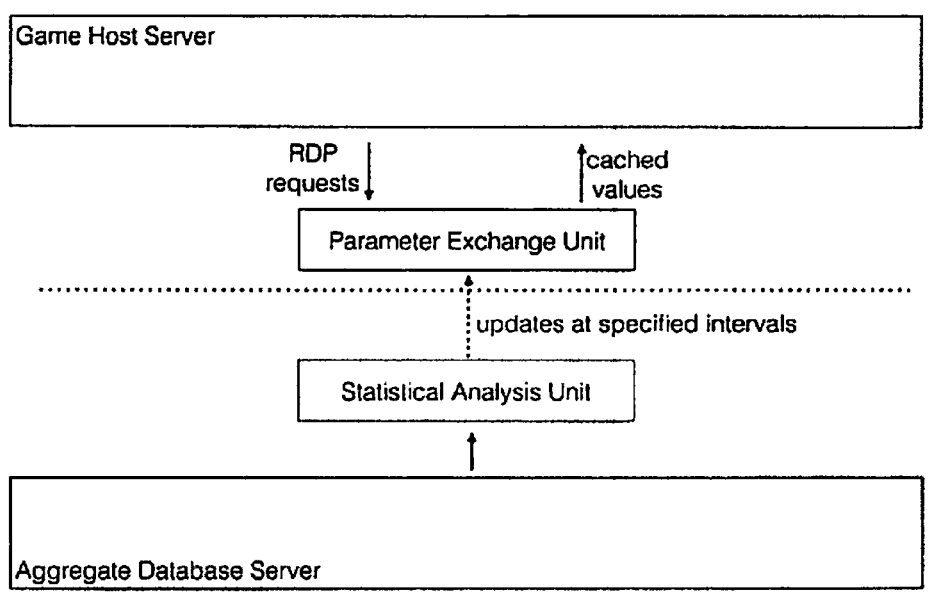
FIGS. 5A and 5B each show a sample method for obtaining reference distribution parameters.

As schematically represented in FIG. 5A, numerous strategies can be employed to update reference distributions depending upon the nature of the data and its rate of change. These methods may be used singly or in combination. One method shown in FIG. 5A depicts that specified reference distributions are updated at specified intervals, for example about every two hours, one time daily, weekly, etc. Between intervals, the reference distribution parameters remain static and may, for example, be stored in a parameter database (See FIG. 5A, parameter exchange unit).

Figure 5B:
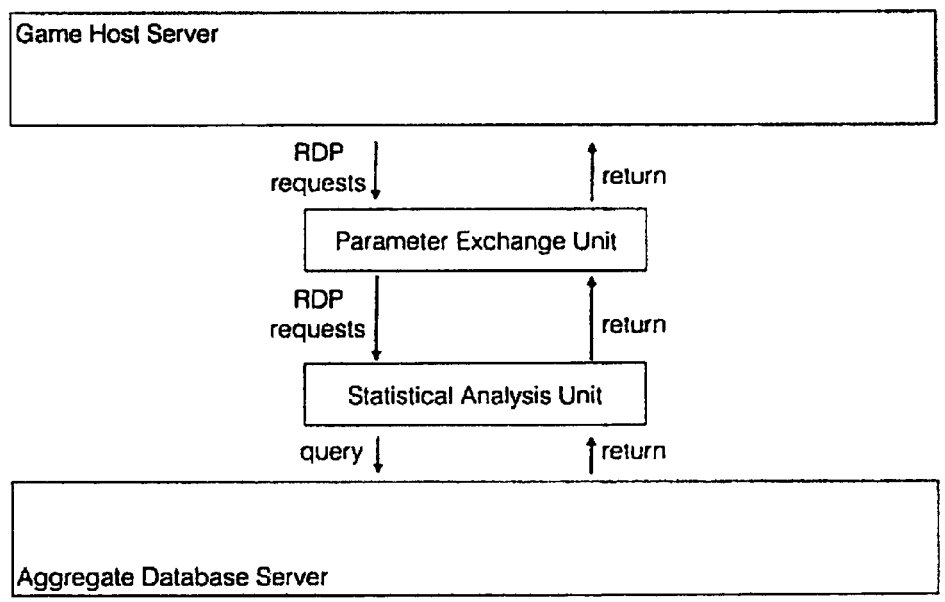
Figure 6A:
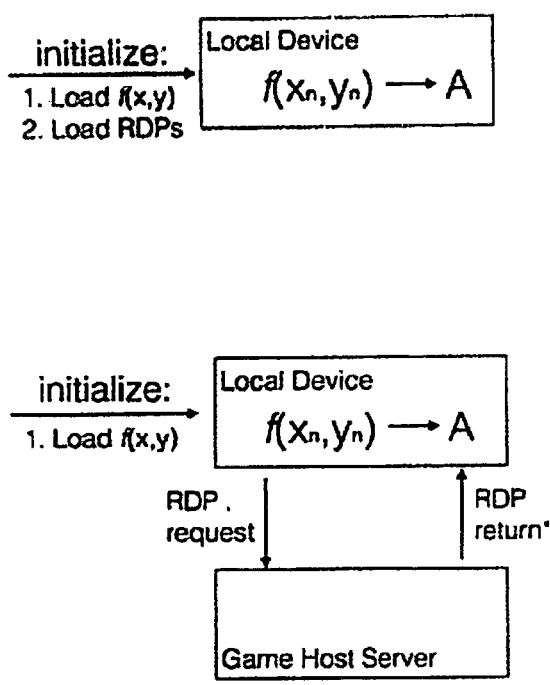
FIGS. 6A and 6B each show sample models for distributing components of population contingency evaluation between local player devices and host servers.
Figure 6B:
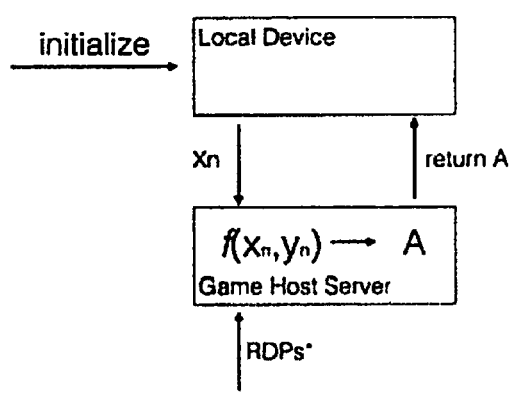

An additional method useful to obtain specified reference distributions and parameters dynamically is through on-the-fly queries, which is schematically shown in FIG. 5B. In this instance, for example, the 'reference distribution unit' might be a database that consists of structured queries that generate values on demand. In one embodiment, these methods are employed separately. In a different embodiment, a combination of both methods is utilized. Further, a method for in-game access to reference distribution and functions for resolving contingencies during game play may be utilized. There are several strategies that may all be deployed depending upon the nature of the contingency (e.g., its complexity, frequency of occurrence in play, temporal resolution between event and outcome, and so on. For example, coded contingency functions and necessary reference distribution parameters may be loaded upon initialization of an individual session so that these contingencies can be resolved on the local device without recourse to the host server (See FIGS. 4A and 6A). As shown in FIG. 6B, the contingency function may be initialized on a local device, but the reference distribution parameters are fetched through query of a parameter exchange unit on the game host server. Additionally, the parameter exchange unit obtains and returns the value determined through the process depicted in FIG. 5A. In a different embodiment, neither the contingency function nor the reference distribution parameters are initialized and instead when a relevant event/action (i.e., 'x') occurs, it is submitted to the game host server for resolution (See FIGS. 4B and 6B). The server then looks up the relevant contingency resolution function, obtains the necessary reference distribution parameters, and resolves the function returning the outcome resolution. The outcome may be returned directly to the player's local device or stored in the player's associated account to be accessed by the local device when appropriate (for example, if the outcome requires a delay).

Figure 7:
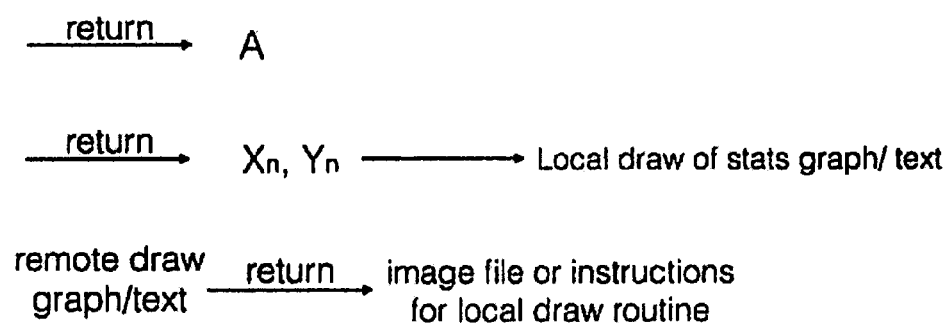
FIG. 7 depicts three sample models of returning data to players after population contingency evaluation.

The entire population normative contingency programming and implementation method and process described herein can be utilized with varying degrees of explicit knowledge of the method or process provided to the end user. For example, users may be completely unaware of the underlying mechanism or may be provided information about the reference distributions and the factors that contributed to the resolution of their in-game event/action. Using the above product selection example, players may optionally be shown the price curve and where their product lies. Also, the player may optionally be shown the unit's distribution curve and where their product lies on that curve. The player may be shown comparison products to inform future decisions (or, for example, may be required to 'purchase' further information as part of the game mechanic). In addition to the information that is returned, the format may be varied, ranging from graphs (including but not limited to bar graphs, line plots, pie charts, etc.) to tables, and text information. In addition, the reference distribution information may be made available before, during, or after the game event/action to inform a player's decision. Some reference distribution information may be made continuously available to players from an in-game query. For example, FIG. 7 schematically represents example implementations for returning normative information within the game. FIG. 7 reflects the return of information following resolution of an event/action (i.e., return A). However, the same architecture for information return may be used for player requested information made available in the game, i.e., where there is no contingency function to be resolved, only the return of the relevant reference distribution information in the appropriate format.

ILLUSTRATIVE EXAMPLE GAMES

FIGS. 8-13

Numerous sample games illustrate the application of the method and process described hereinabove. The first example, "Cats" is fairly simple and is intended to clarify the method and application of population contingency game processes. The second example "the Campaign Trail" provides a somewhat more complicated game having more features than the Cats game.

Example Game #1

Cats

In this game, players collect cats. There are 20 different kinds of cats and each kind has a different value. The objective of the game is to build the most valuable cat collection possible. To do this, players buy and sell cats through a bidding process. There are a precise, finite number of cats available in the game. Each new player starts with 20 cats, 1 of each kind. These new cats are added to the game so that at any time in the game there exists precisely 20 times the number of players in the game. Thus, with 100, 10,000 and 1,000,000 players, there would be 2000, 200,000 and 20,000,000 cats available for trade (i.e., buy/sell). The aspect of the game that is population contingent is the value each kind of cat, to be detailed below. It should be noted that game itself, or one or more game administrators, could optionally award a prize to any individual winning player, individual winning players achieving a tied score, and/or a team of players upon conclusion of the game.

Each player would have an account with the game. Referring to FIG. 1B, the interface could include: an icon 200 for each kind of cat and with each icon information stating (i) how many of that kind of cat the player has in his/her collection, (ii) the current value of that kind of cat, (iii) the total value of those cats in the player's collection (i.e., if the player has 3 of cat type x, each worth 100, the total would be 300), (iv) a 'buy' action button 202 associated with that kind of cat and (v) a 'sell' action button 204 associated with that kind of cat. In addition, the player has (i) a 'bank account' 206 with an indicator on the graphic interface that tracks how much in-game money the player has and (ii) an 'assets' indicator 208 that calculates the total value of the player's current cat collection and (iii) a percentile rank 210 that indicates where the player's cat collection value ranks in relation to other players (i.e., 82nd percentile, more valuable than 81% of other players).

The population contingency within the game is the value of each kind of cat, which, like housing sales in real estate, will be dependent upon the recent prices players have paid for each kind of cat. That is, if players are paying a lot for one kind of cat, they are valuable. In contrast, if players are paying little, that type of cat is not valuable.

As clarification, it should be noted that some elements of the game could be dependent upon player information, but do not constitute a 'population contingency' as described here. For example, the total number of cats available within the game is dependent upon the number of players. However, this is not a population contingency because that 'population information' (i.e., number of players) is not used to evaluate any outcomes within the game. Instead, in this Cats game, only determining the value of each kind of cat is a population contingent process dependent on regularly updated player population information as described herein.

When a player first signs up and begins the game, he will start with one of each type of cat at whatever the current values for the different kinds of cats are at that time. He will also start with $500 in-game dollars. The only way to obtain additional in-game dollars is to sell one or more cat(s) from the player's collection, thus reducing the overall value of his/her collection. The only way to increase the value of the collection is to buy additional cats, thus reducing the player's available funds. The mechanics of the game arises from a bidding process. A player who wishes to sell a cat(s) sets a price and the player's cat(s) then goes on the market at that price until someone purchases the cat(s) at that price (e.g., a player may have 13 of cat type 4 and chooses to sell three of them for $190 in-game dollars). If another player purchases the cat(s) at that price, that cat will be removed from the player's collection and the value of his collection accordingly decremented (according to the current value of the cat in the system, irrespective of the sale price) and his funds will be incremented by the sale price. If a player wishes to purchase a cat(s), he will click the purchase button 202 on the type of cat he wishes to purchase. A popup window (not shown) will display all the cats available at what sale prices. A player then selects how many cats and what price he wishes to purchase them at. The cats will then be added to his collection, increasing the value of his collection according to the current valuation of that kind of cat in the game, and his in-game dollars will be decremented by the sale price.

The first step in the method is to identify the population contingency(ies). The population contingency here is the value of each kind of cat, which will be calculated as the prevailing sale price for each kind of cat during on-going gameplay.

The second step in the method is to identify the reference distribution. The relevant aggregate data comprises completed sales of cats, which can be stored in a simple table that identifies (i) sale date/time, (ii) type of cat, (iii) sale price. The statistic to be used will be the average sale price. The period of which the average is taken will have significant effects on how the game proceeds. Basing the average sale price on a broad window of time (e.g., all time since game started) would likely result in very stable, slowly changing prices that would, over time, become increasingly similar between kinds of cats. In contrast, a shorter window of time could likely capture rapid fluctuations and changes in player behavior. Thus, for this game, the average sale price is based on all sales for each specific kind of cat in the last 2 minutes. This means that every 2 minutes the value of each kind of cat may change (as well as the value of individual player's cat collections).

The third step in the method is to identify the linking function. In this example, the outcome to be evaluated using population contingency is the total value of each player's cat collection based on the 'current market prices' of the different kinds of cats. f(xn,yn): For each kind of cat in a player's collection, the number of that kind of cat multiplied by its current value (i.e., based on on-going gameplay), summed across all 20 kinds of cats equals the total value of that player's collection (updated every 2 minutes). The key population contingency dynamic that results from this is that players change their buy/sell strategy as the value of cats change. However, as players change their buy/sell strategy, this in turn further changes the value of cats, which induces further player behavior change and so on. In this sense, then, the outcome of a players buy/sell strategy is dependent upon the buy/sell strategy of everyone else playing the game.

The fourth step in the method is to establish architecture for data collection. As the aggregate data and reference distribution/statistic is exceptionally simple in this game, the entire game may be maintained on a single host server in a single database with four simple tables: (1) a player table that includes each player's user name and how many of each kind of cat he has in his collection as well as his in-game dollars, (2) a cat table that list the most recent value of each type of cat, (3) a sales data table that records each cat sale, the sale price (i.e., per cat, not total) and a date/time stamp, and (4) a cats-for-sale table that records all cat sale offers initiated by individual players and includes player_ID (i.e., of seller), kind of cat for sale, number of cats offered, price per cat, time/date stamp. In this simple game, the 'parameter exchange unit' is simply the cat table listing the population contingent variable value of each kind of cat.

The fifth step in the method of the sample game is to establish operational procedures. When players offer cats for sale, the offer is sent from the local machine to the server and entered into the data table. When players seek to purchase a cat, the player's local device will send a query to the cats-for-sale table and obtain all the available sale offers for cats of that kind. If a player purchases the cat(s), that offer will be removed from the cats-for-sale table, the sale entered into the sales table, the cats added to the player's profile, appropriate funds deducted, and the cats removed from the seller's profile. Additionally, appropriate funds are added and the value of each player's cat collection is recalculated and refreshed on the local device. Every 2 minutes, the backend server will query the sales table and determine the average sale price for each type of cat, which will then be used to update the cat table for all 20 kinds of cats. The sales table will then be cleared allowing the next 2 minutes worth of sales to populate the table (if no sales occurred in 2 minutes, there would be no update; additionally, a minimum number of sales may be set for updating to prevent low numbers from skewing the game, i.e., minimum of 100 sales of a kind of cat before an update is allowed). The player's local device will, in turn, query the cat table and update the values on the player's local device and recalculate the value of his/her collection every 2 minutes also.

The sixth step in the method is to provide information to the user. In this simple example game, the information return to user is simply the updated values of each kind of cat. Notably, the 'outcome' of player activity is the degree to which on any given cat transaction each player gains/loses either value in their cat collection or funds. This is not calculated for this simple game. However, a more user friendly version could, in fact, calculate gains/losses much like tracking stock market trades. How much an individual player gains/loses (A, outcome) as a consequence of a particular action (X, player action; sell/buy) is contingent upon aggregates player activity (sales) that determine the value of the cats being traded. This population contingent outcome, in this simple example game, is implicitly returned to the user in the form of changes to the value of their cat collection and in-game funds.

It should be noted that in the Cats game, or any embodiment discussed herein, a game could consider a designated team of individuals as an "individual player" for calculation purposes.

This Cats game is intended to highlight the method of integrating a population contingency process into a game, using a simple game with a single population contingency for illustration purposes. In contrast, the following example represents a perhaps more complicated game application.

Example Game #2

The Campaign Trail

Figure 8:
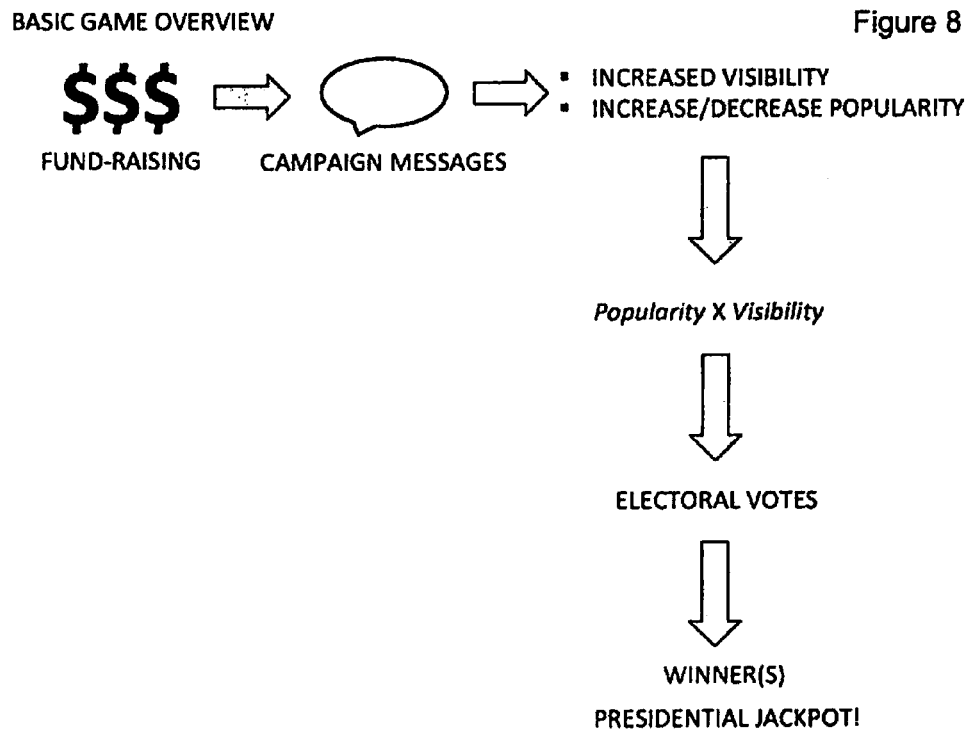
FIG. 8 is a basic overview of an example game.

1. Game Objective:

As schematically shown in FIG. 8, in this population networking game, players will conduct a virtual campaign to be elected president. Like real-world campaigns, they will have to 'get their message out' and fund their campaign. The effectiveness of their messages and fundraising will be evaluated according to population contingency principles described above. Specifically, their popularity will be determined with reference to aggregate player data and choices. This popularity, in turn, will determine their ability to raise funds, which will determine how broadly they can broadcast their message. Players will accumulate Electoral College votes based on their 'ranking' in each state. Ranking is a combination of their popularity and visibility in each state. The player(s) with the highest ranking in each state will be awarded the Electoral College votes for that state. The player with the most electoral votes will win the game (many players may tie for the highest number, in which case they would all win). A percentage of all profits will go into a Presidential Jackpot to be split among the winners.

2. Game Structure and Mechanics

As shown in FIG. 9, there are numerous sample categories of player activities/actions including plan campaign, fundraising, and campaigning.

With respect to 'Plan campaign', players provide responses and evaluations that are used as data to reflect player beliefs, opinions and norms (i.e., aggregate data). To ensure players engage in this activity, this is a primary way for players to generate funds (i.e., they will earn in-game funds for responding). Players provide their opinion on events, statements, actions and issues in the real political field, as well as responses and evaluation to material generated by other players. This evaluative 'response' data in aggregate from all players is used as the reference data upon which resolving actions within the game for individual players will be contingent.

With respect to 'Fundraising', players can host virtual fundraisers. To engage in fundraising, players must have sufficient in-game funds and, in some types of fundraising choices, may have to meet population network requirements. The outcome of these fundraisers are not determined programmatically, but determined through population contingency: the yield on a fundraiser will be contingent upon the player's visibility in the locality he selected to host the fundraiser, his popularity in that locality, and in some cases, characteristics of his social network.

With respect to 'Campaigning', players select various methods of delivering their campaign messages and target those messages to different localities and regions. The various campaign actions will each have slightly different characteristics, but all share a common mechanism. A player will select what message he/she wishes to deliver and the effectiveness of that message will be calculated against the population norms in the area(s) targeted by the player (an example is detailed below). The number of messages a candidate delivers to an area will determine his/her visibility in that region, which will again be contingent upon how many messages players, collectively, are targeting to the region in question. The evaluation of those messages against the norms for that region will determine a popularity score.

The player's rank in that region is the combination of his popularity and visibility. There are three general mechanisms for campaign actions: First, players simply select messages from the campaign cloud (see example below). Second, rather than select their message, players respond to a question or questions (analogous to an interview). Finally, players may produce actual 'campaign materials' to post within the game. Additionally, demographic information, including whom the player intends to vote for in the actual presidential campaign is collected. This information may also be used in population contingency calculations.

FIG. 10 depicts game mechanics, constraints and dependencies of the sample game. Funds indicate how much in-game money a player has in his/her campaign chest. Funds are necessary to engage in any activity above except planning a campaign, which primarily generates funds. Funds can be developed through fund-raising activity, via donation from social networks, from in-game purchases or from 'campaign planning activities,' i.e., responding to information that contributes to the reference database. The outcome of fundraising is dependent upon a player's popularity and visibility, i.e., is population contingent.

There are only three player levels associated with this sample game: local, regional, and national. A player has to work up through these levels to reach broader audiences. This is equivalent to experience points, which demands that the player play the game in order to have more options available. In this case, the critical 'option' is the ability to broadcast one's campaign message more broadly. Notably, higher levels are also more difficult as any given message may have different effects in different regions, requiring greater strategy in crafting the campaign.

Player visibility is determined by the number of statements a player makes in any region. If a player takes no campaign actions in a state, he is invisible there. If he takes many actions, he is increasingly more visible. Visibility is regionally determined and always in comparison to what other players are doing, i.e., by locating an individual player on a 'visibility' distribution within that region.

Player popularity is a measure of how a player's campaign evaluates based on the norms among all players, i.e., in reference to aggregate opinion data generated within the game. This measure will be available at different levels: i.e., calculated for all local areas in which a player is active, all regional areas in which a player is active and nationally. The levels at which this is calculated is dependent upon player level.

Player rank is an on-going calculation of the number of electoral votes the player has captured, arising from a combination of the player's coverage and popularity. Player rank fluctuates as the game progresses. For example, a player may rank highly one day, but the next day, someone else may have stolen the electoral votes for California.

3. Game Interface

The game interface may consist of a series of screens, including (a) maps that reflect the player's status in different states/regions, reference/comparison maps (i.e., information about different regions analogous to 'red/blue' states except related to in-game metrics), (b) menus of different options (e.g., fund-raising, campaign activities, etc.), (c) meters reflecting funds, visibility, popularity and rank, (d) meter indicating value of Presidential Jackpot.

Implementation of Population Contingency Process

The outcome of player activities and their progress and success within the game—including their ability to raise funds, the effectiveness of their campaign activities and their overall rank (i.e., electoral votes garnered)—is all contingent upon the population norms, which is aggregate opinion data collected within the game across players in the game. That is, the outcome of a player's activities is population contingent. So for example, how much money a player raises from a fundraising dinner will depend upon his coverage and popularity within the region he chooses to host the dinner. If a player hosts a dinner in a region where his views are unpopular, he will gain little return. However, if he hosts in a region where his views are popular, he will reap a larger return. Similarly, when he purchases a campaign activity, such as a 'stump speech,' its effectiveness in increasing his rank in the region in which it is delivered will be contingent upon prevailing views in that region. So if he chooses to take a pro-choice stance in a predominantly anti-abortion region, he will lose standing. Conversely, if he takes a pro-choice stance in a pro-choice region, he will gain standing. However, as players progress in the game, their visibility increases such that a statement in one region will have effects in other regions, precluding the possibility of saying only what is popular in each area. Thus, these campaign actions illustrate the way that contingencies to be parameterized are identified by a linking function drawn from aggregate data.

The method for identifying reference distributions includes a reference database that is implemented as a 'campaign cloud' in this game. Players are provided an on-going set of statements, videos, opinions—drawn both from media in the real world and from other player activity—which they will evaluate. Though the evaluation may be multiple-choice responses such as "this person is a genius" or "I strongly agree", ultimately all responses will be translated into a numerical scale reflecting a range from "strongly agree" to "strongly disagree." A multitude of numerical scales may be used. For illustration purposes, an integer scale of −2 to +2 is used with higher numbers associated with stronger agreement. Within this 'cloud' will be thousands of items, each rated by large numbers of players. Similarly, each player will have reacted to a variable number of these items. Analysis of all player responses to each item will comprise the population norms reference data. The statistical characteristics of the population norm distributions will comprise the 'reference parameters' from the process description above. So for example, an anti-abortion 'message' from the campaign cloud may be selected and issued by the player in the southern region. In the database, there will be information on how all players in that region rated this message. That regional rating of the anti-abortion message by players will then be used to determine the popularity an individual player obtains by issuing that statement in the south. Thus, if statement x, on average, received a +1.6 in that region, then the player's popularity will increase. Conversely, if the statement received an average of −1.6, the player's popularity in that region will decrease.

The game also utilizes a database and uses statistical procedures for extracting reference parameters. A complete specification of the database is beyond the scope of the present description and a matter of standard art. A rudimentary outline of the structure is presented. Though any database may be used, depending upon the needs of individual games, in this instance a relational database is employed. Similarly, any relational database software may be used (e.g., MySQL, SQLite, Oracle, etc.).

Figure 11:
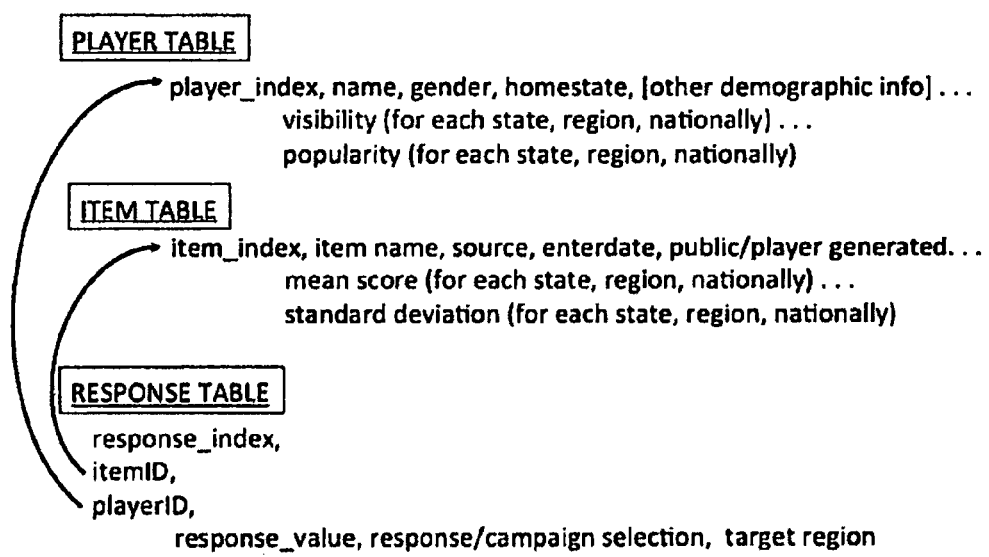
FIG. 11 shows a rudimentary sample database associated with the example game.

For this game example, there are three basic tables (see FIG. 11 showing tables and fields). A player table lists each player, their demographic (gender, homestate/region, age, etc), game play information (daily time playing, cumulative play time, etc.), their in game stats, which includes their level, current funds, visibility and popularity (for each locality/state, each region and nationally), and their ranking for each locality/state, region and nationally.

The item table (i.e., campaign cloud) lists every statement, clip, news item, etc. that has been made available within the game for players to respond to and/or select for their campaign, including player generated material. For each item, there are fields (a) that include 'housekeeping' information (where the item came from, when entered into the game, whether it is player or public material, etc.) and (b) describe the statistical distribution of opinion on that item (e.g., mean, standard deviation of player ratings) for each locality/state, region and nationally.

The response table includes every instance any player responds to or selects an item to use in a campaign. An entry is created in the response table that includes the item number (linking it to the item table), a player number (linking it to a player), and the actual response made by the player (i.e., from −2 to +2). The response table also comprises the aggregate data from which the message statistics are derived.

In a final design and production, other tables are optionally added. For example, useful optional table may be ones that manage population networking data, list 'factors' useful in grouping items/messages into subcategories, etc. These additional tables reflect further elaboration and sophistication in game design and development.

Although there are numerous statistical approaches that may be utilized in the sample game, the simplest will be illustrated here. Additionally, though several elements of the example game are subject to population contingency evaluation (fundraising outcomes, campaign outcomes, etc.), only one, evaluating the outcome of an individual player campaign on their popularity is considered.

In issuing a campaign, the player selects a specific message from the campaign cloud to deliver to specific regions (state, local, or national). The evaluation or outcome of that campaign is based upon aggregate data from a portion of all players expressing their opinion (approval/disapproval) of that particular message. The 'reference distribution' in this case is extremely simple: the mean rating among players in the specific region that have evaluated that particular message. In the database, for every item/message in the cloud (i.e., item table), the responses from all players within a region (i.e., state, regional, national) for each item will be averaged to produce a mean rating of approval/disapproval (e.g., +0.8 for a specific item) for that item.

For each item in the item table, a SQL query extracts all data from the response table for that item together with the state/region from which each individual response originates. For each item, this query will be used to calculate the mean evaluation response for each state, each region (defined clusters of states), and for the national level. For each item, then, these means will be stored in the item table to be used in calculating the outcomes of individual campaign actions during on-going gameplay. The process will iterate through all items in the campaign cloud (i.e., item table). As new player evaluations are continually added to the aggregate data, these means used to determine campaign effectiveness will need to be regularly updated. In this example game design, the backend 'reference server' that updates and maintains the aggregate data continuously loops through all items in the campaign cloud/item table and recalculate updated means.

It should be noted that initially there would be no data in the reference databases. A 'starter' opinion database with a limited number of messages and ratings could be used to initiate game play while player generated data accumulates. For example, 100 messages could be initially compiled and responses from 100 people to these messages obtained (e.g., using Amazon's Mechanical Turk service). The representativeness of the initial database is of minimal concern because as real player data accumulates, the 'starter' database will become increasingly insignificant as it will represent an increasingly smaller proportion of all responses used in the analysis. Moreover, in addition to a starter database, beta-testing could provide an opportunity to build a still larger and more representative database before official game launch.

Resolving the outcome of player actions (i.e., determining the amount of money raised from a campaign, determining the effectiveness of a campaign effort) utilizes reference parameters from the aggregate data. Similar to the above example, only one example is discussed herein: the resolving of how a campaign action on the part of an individual player affects his/her popularity. Again, the process is continuous as the program iterates through the players, identifies pending actions to be evaluated and evaluates them using the most updated reference parameters. Although a specific period is defined, any period could be used, e.g., every 24 hours, for iterating through an updating player action outcomes.

Additionally, the game includes the method steps of defining the linking function and resolving contingencies. The process of resolving the effectiveness of a campaign action and the outcome of which is an increase or decrease in a player's popularity within different localities/states, regions and nationally, depends upon where the player targeted his/her campaign.

In the current example game, the linking function that determines how a player's selected campaign message affects their popularity in a selected region with respect to aggregate data is defined by:

new player popularity in region x=current player popularity in region x+the mean rating of the selected message in region x.

For example, a player may have a popularity score of 187.5 in Illinois. He issues a message (e.g., message 913) that argues for gun control. That message has been rated with moderate popularity in Illinois, with a mean approval of +1.2. The player's new score becomes 188.7. At the same time, if he had targeted that message to both the midwest and the southern regions, his popularity score might rise in the midwest (as in the Illinois example) but in the southern region, where that particular message has a mean disapproval rating of −1.2, the player's popularity score in the south would be reduced.

Again, this is a rudimentary implementation intended for illustration. A multitude of elaborations are possible. For example, instead of simply adding the mean evaluation of a message in a region to a players popularity score, the means of all the messages a player issues in a region could be averaged instead, yielding popularity scores that always lie between −2 and +2 in this design of the game. More sophisticated implementations could combine an approval/disapproval rating with a 'how important is this issue' rating. In another variant, a separate positive and negative popularity score could be computed by considering the means of approval and disapproval rating independently. In yet another variant, the effect of a particular campaign message on a player's popularity could be weighted according to the importance of the issue to each region. This could be accomplished by determining the degree to which responses on any particular item correlate to players intended presidential vote and weighting the contribution of a campaign message to popularity score based on this. For example, using our example from Illinois above, the amount that a campaign message contributes to popularity could be scaled according to the correlation of that message with presidential voting intentions. If the campaign message was highly correlated to presidential voting intentions, such as 0.80 correlation, then 1.28 would be added to that player's popularity in Illinois as a consequence of that campaign message (i.e., 1.6*0.8). In contrast, if the message/item were poorly correlated with voting intentions, say 0.12, then 0.192 would be added to the player's popularity score in Illinois as a consequence of that particular message (i.e., 1.6*0.12). In this variant, the game could draw upon two pieces of aggregate data: player ratings of a particular message and players' stated voting intentions in a presidential election. From these, two reference statistics are obtained: a mean approval/disapproval rating for that item and its degree of correlation with voting intentions, both of which are then used in the linking function to evaluate the outcome in terms of how issuing a particular campaign message in a particular region alters an individual player's popularity in that region. In the game design, this variant would prevent players from gaining popularity by selecting non-controversial messages such as 'animals should not be mistreated' and avoiding difficult, controversial topics. This illustrates how the linking function, and the aggregate, game-generated population data upon which it will draw, may be tailored to achieve the design purposes of the game and the specific population contingency being implemented.

A different linking function may be utilized in the example game. By iterating through the linking process described above, each player's popularity in each region is updated regularly. However, the popularity score as described above does not discriminate between a player that is highly active and has issued thousands of campaign messages in a target region and a player that has played minimally and, perhaps, issued 10. In this sense, the game does not simulate real-life where the amount of campaigns and publicity one engages can make one's messages more or less visible. And notably, the need to be visible requires money, which in this game is a critical component of the game: raising funds. Adding a population contingent visibility score provides another example of creating a linking function. Visibility in each region could be determined using percentile rank. The relevant aggregate data and statistic is to rank players active in a given region according to the number of messages they have delivered in that region over a specified time period and transform this to a percentile rank: i.e., player A delivered 328 messages, which is greater than 92% of other players active in that area, giving them a visibility score of 0.92, where 1 is the highest visibility score, meaning the player has delivered the highest number (or tied) of messages in that region. Again, there are elaborations and alternative linking functions. In order to avoid a new player always being nearly invisible because players that have been playing much longer always have more messages, rather than using absolute number of messages delivered in a region (for example, California), what may be used is the percentage of a player's total messages that are targeted to a region. That way, visibility arises not from having 10, 100, or 1000 messages in California compared to others, but from allocating 8%, 14%, or 23% (for example) of one's messages to California. Again, designing the appropriate linking function will depend upon the purposes to be achieved in game design. Once popularity and visibility are determined, these can be used to calculate the return on funding activities using similar statistical methods not further elaborated here. Combining players' visibility and popularity scores in each state (e.g., visibility*popularity), could, as with visibility, yield a percentile rank that determines each player's relative standing in each state with electoral votes being assigned to those players tied for top rank.

The effect of this on gameplay is that how much effort a player needs to focus on a particular region will be contingent upon how much other players are focusing on that region, which importantly may shift over time as player activity shifts and changes. These shifts create interesting properties in the game. For example, there is no advantage to 'over working' a region because once a player's number of messages place him on a curve such that he/she captures close to 100% scaling, there is nothing gained by delivering further messages, at least in terms of visibility (although he may refine his message and alter popularity with additional messages). However, if a region is contested, more players will deliver more messages, thus shifting the entire curve. A player may have 100% scaling on Monday and by Friday have lost ground (say 60% scaling) because other players have increased their activity in that region. This creates a dynamic, unpredictable game where player strategy must constantly adapt to what, in aggregate, other players are doing. This method of creating and programming population contingencies confers this dynamic quality.

As noted in the process description, there are multiple different architectures that can be utilized in the sample game, depending upon the specifics of the game, to achieve population contingency programming.

Figure 12:
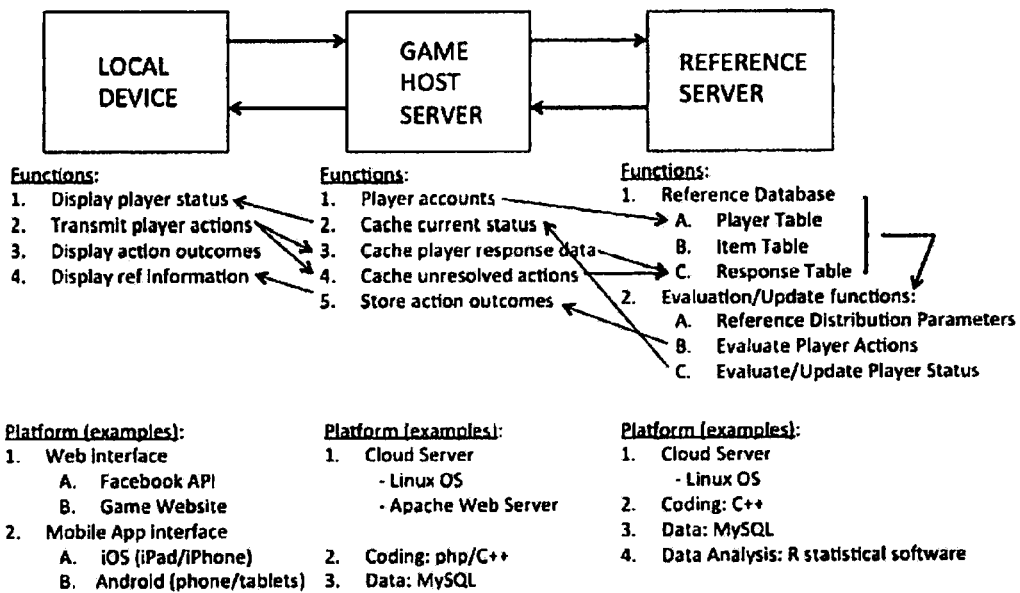
FIG. 12 shows a sample potential instantiation of population contingency architecture for the example game.
Figure 13:
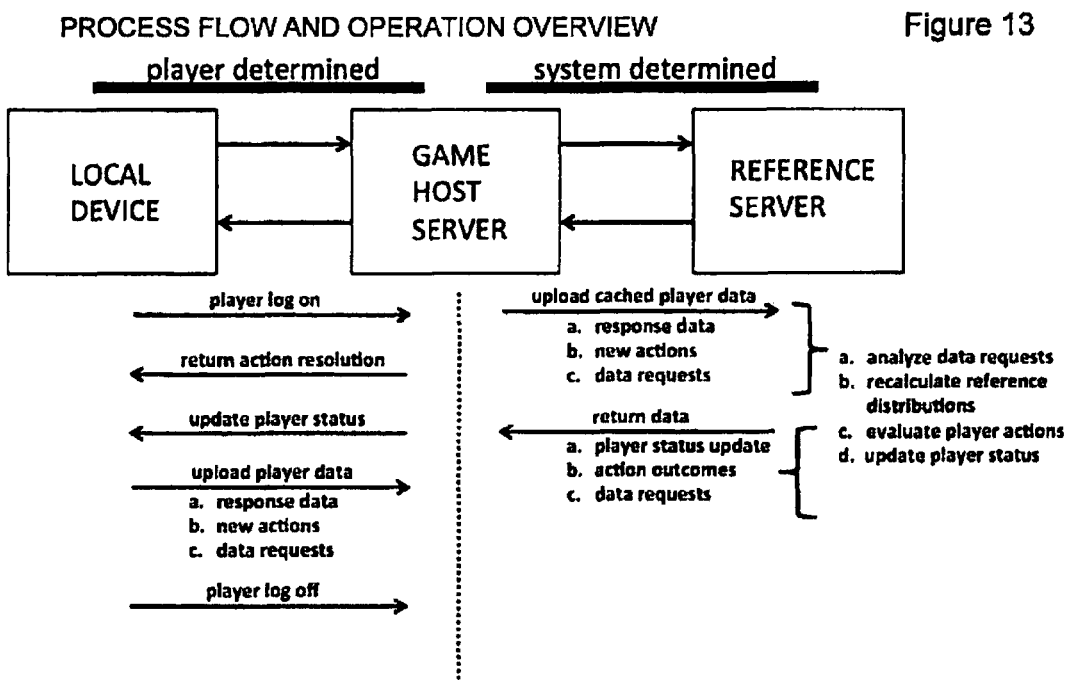
FIG. 13 shows sample information and operations flow for the example game.

As best seen in FIG. 12, the sample game utilizes a parameter exchange unit, an aggregate reference database, and analytic units that is combined as a single remote server unit, here called 'reference server' that communicates with another remote server unit, the 'game host.' The game host collects information from players when they log on, store their unanalyzed game actions and update their status and game information, including reference information and outcomes of previous actions they took. The game host is the server communicating with players, including holding player account information in format(s) appropriate to the game interface itself. The game host communicates with the reference server unit in two primary ways: (1) forwarding data to be added to the database (i.e., player responses to be added to the response table) and (2) submitting player actions for analysis against the reference database (also added to the responses table). The reference server returns updated information for each player to the game host server that will in turn provide this information to users on their local devices. The reference server returns two types of information to the game host: (1) player popularity, visibility, ranking and funds, and (2) the outcome of player actions evaluated by the reference server according to the defined reference distribution and linking functions. The game host server will store this information in the player's account to be provided as needed when players engage the game on their local devices. Thus, this simple architecture consist of three layers: local device, game host that manages the transfer of information between players, and the reference server that carries out all the analysis necessary to operate the game. Many potential configurations of hardware, operating system and programming languages can be utilized to implement this architecture, which will depend upon resources available during production (e.g., programming expertise of the team, available server services, etc.). For illustration purposes, the game and architecture may be implemented on cloud servers through a cloud server service (e.g., Amazon cloud service), running Linux and using primarily MySQL (database), R (data analysis) and C++ for reference server programming, Apache web server and php for game host server operations, and MySQL to manage player accounts. The local devices for this game are: (i) web connections (through either a facebook interface/app and/or direct connection to a game website) and, (ii) mobile devices, i.e., iOS (iPad/iPhone) apps and android (phone/tablet) apps:

With respect to FIG. 13, response information is sent directly to the game host server as responses are generated. If the connection is lost, the responses are cached on the local device until the connection is restored. The response information is transferred from the game host server to the reference server at scheduled frequencies (e.g., every 5 minutes). Additionally, each reference distribution for each campaign cloud item is updated through a continuous iterative process. When a player logs on and makes several decisions (e.g., taking a campaign action or hosting a fund raiser), there will be a delay in determining the outcome (set programmatically). When that player logs off, his/her choices are sent to the game host server and evaluation of his/her actions against reference distribution occurs remotely by the reference server when the server updates the player's status as described above. The outcome of these analyses will be returned to the game host server and stored in players' accounts. After the delay period has passed, these outcomes will be available to the player at the player's next log in. Thus, in this implementation, all population contingencies are resolved remotely with a delay (i.e., none resolved locally on local devices). Notably, if the delay for results is set to be less than 24 hours, this will require an 'on-demand' evaluation of player actions, not detailed here. When a player logs on, the game host server makes available the outcomes of the player's previous actions (according to delay timing) as well as an updated map of the player's stats/standing (i.e., visibility, popularity, ranking).

Thus, the architecture and operations applied to this specific game are simple where virtually no processing or computations are carried out on the local device of the player. The player is provided with a temporarily static (i.e., 24 hours) picture of the state of things, including his position, against which he can explore, decide upon a strategy, and invest in actions or buy information. The outcome of individual player actions and the aggregate impact of all players' actions on the reference database and parameters are determined entirely remotely on the reference server.

Finally, the data accumulated within this game may be used as a form of continuous, dynamic public opinion polling. Specifically, player information may include detailed demographic information, the player's evaluation of each actual candidate in the presidential election, and whom he intends to vote for. Aggregate responses on any item in the campaign cloud (for example, a statement by real candidate x made at a certain time) can be analyzed to determine, among all players, the degree of agreement/disagreement the game population has with that statement. Further, the factors that determine agreement/disagreement, such as age, location, or occupation can be determined. Similarly, the degree to which a player's response to any item correlates to his voting decisions can be determined. What is critical is that at least some portion of this player generated data is used to determine outcomes in gameplay, distinguishing this from merely gathering data in the course of engaging a player in a game, as described in the population contingency method detailed above.

Results Achieved by Applying Invention to Example Game #2

The game is dynamic and unpredictable but the variation arises not from chance, but from aggregate population behavior. Thus, a player's standing may rise and fall, requiring them to constantly understand the 'forces' that shape his standing and to constantly revise and update his strategy. As each player continually modifies his/her strategy, the aggregate play also changes, requiring further adjustment and so on. In this way the game is constantly changing and never static, but the factors that drive that change is the players themselves.

Participating in the game may provide an educational experience. It is not merely that the game is delivering some sort of content that can be called educational, but the experience of adjusting one's strategy engages the player in learning about the political process and responding and adjusting to the deeply social character of that political process.

Further, the game may provide a form of social discourse. In a sense, because players are always adjusting their play strategy in response to 'what everyone else is doing' the choices and changes in those choices represent, on the whole, a form of political discussion, a collective adjustment to determine the platform that appeals to the most people.

Additionally, the game may increase engagement in the political process, including potentially generating more thoughtful, knowledgeable participants and may provide a potentially rich source of information. In a sense, the reference database constitutes a dynamic and constantly growing poll. Instead of a research institute calling a certain number of people and asking various questions, generating a single, limited dataset frozen in time (and cost intensive), the game provides a constantly growing database that captures individual responses to events, people and issues in the political process. This provides a rich dataset in which (a) patterns and correlations can be observed and (b) how opinions/views change over time can be measured, both of which are difficult with traditional polling methods. Moreover, as a method of public opinion data collection, it is extremely cost effective. Ideally, players (those being polled) pay. Critically, rather than simply answering survey questions, players are providing data in the course of engaging in a goal-oriented activity, i.e., winning the game, and thus may reconsider and modify their various choices over time in a way not captured by one-time survey questions in which the answer provided by the respondent has no consequence to him/her personally.

Other Example Games

The game illustrated above was described to provide one embodiment of the population contingency programming process and methods described in this application. However, the number of games that could be developed, and the purposes behind the games, is nearly infinite. Two brief examples will be provided, illustrating different potential purposes and objectives for these types of games.

Public discourse and conflict resolution game: Imagine a local school district in which a great deal of conflict has arisen on how to resolve budget deficiencies. School board meetings have often become contentious shouting matches, with different sides no longer listening to each other. The entire situation is in stalemate and generating much rancor. Imagine introducing a game somewhat analogous to the game described above, except rather than running a campaign to be elected president, the objective of the game is to be the virtual superintendent of schools with the greatest support. In the game, a player has to create a budget, negotiate contracts, design programs, etc. These large scale activities (e.g., writing a budget) are atomized into smaller units, much like players in the president game select discrete campaign 'messages.' Players construct their budgets, etc. and receive constant feedback based on aggregate player activity/data, as in the election game above. For example, a player deletes the arts from his/her budget but aggregate game data shows this is extremely unpopular, so that players progress toward 'winning superintendent' is diminished. Eventually, a set of choices for budget, etc. will arise that satisfies the greatest number of people. What is critical in this is that it is not merely opinion polling. Rather, players are actively receiving feedback and revising, reconsidering their positions: the players are learning and adjusting. The data generated can help clarify precisely what are the most controversial elements that divide the community, which elements are more amenable to compromise, what sort of activities/decisions affect certain segments of the community and so on. In short, the game represents a novel and potentially profoundly effective way of resolving a community-based conflict. Such 'public discourse' versions of this game could conceivably be applied to many problems and issues within our society and communities.

Both the president game described at length as well as the school district example above provide a form of opinion polling, though in both cases the explicit purpose of the game is not opinion polling. A population contingency game could be explicitly used as a method of opinion polling, where instead of devising a questionnaire, hiring staff to administer the poll (including telephones, buying list of potential subjects, etc. etc.) a game is designed. So for example, rather than designing a poll to determine public opinion on current tax laws (e.g., 'should the rich be taxed more?'), a game can be designed in which players design a tax system by modifying the current system, where their proposals are evaluated against population norms (i.e., what all the other players believe is appropriate). Again, in contrast to a one-time poll, this provides on-going information and shows how players' opinions change in the context of other information and over time. Such a game could introduce an intermediary layer where a player's choices (e.g., increase taxes on middle class by 2%) affects all other players (e.g., each player's income, depending upon his income class is reduced by a certain amount because of the tax increase), who then respond to those effects. The intent here is not to offer a complete design, but to suggest applications of the game process proposed here.

In the examples provided thus far, there is an implicit learning process as the player engages the game. A game could be designed specifically to emphasize this learning process. Imagine a game in which the game objective is to successfully launch a company. The purpose of this game is learn to about the process of creating a company. Much of the process of launching a company is population determined. Getting investors, putting together a team, and marketing all depend upon a population response. In an educational game designed to develop business skills, individual players could propose faux business ideas in which they have to get funding (which means developing a pitch that generates a positive response, including promised returns on investment), and put a team together (which includes not only the pitch, but role offered, shares offered, etc.). The outcome of their success on each element of launching a company can be determined within the game by population contingency mechanisms. Again, the game is only sketched in broadest strokes here.

There exists a nearly endless number of possible applications of population contingency gaming as described here. One embodiment was described at length and three additional potential games, illustrating different overall purposes, were described briefly. However, it should be noted that numerous modifications to the features described and shown are possible. Accordingly, the above described and illustrated embodiments are to be construed as merely examples of inventive concepts expressed herein. For example, a game designer could add a programmatically determined outcome to a game such that the game includes one or more population contingent outcomes and also one or more programmatically determined outcomes. Regardless of the specific games, applications and purposes, however, developing a game using the population contingency method described herein results in a significantly different kind of game than those currently in existence.

INDUSTRIAL APPLICABILITY

Numerous modifications will be apparent to those skilled in the art in view of the foregoing description. Accordingly, this description is to be construed as illustrative only and is presented for the purpose of enabling those skilled in the art to make and use what is herein disclosed and to teach the best mode of carrying out same. The exclusive rights to all modifications which come within the scope of this disclosure are reserved.

What is claimed is:
1. A method for guiding gameplay of players participating in a computer-implemented virtual game, the method comprising:
  constructing a population contingency comprising aggregate data collected from a plurality of players by a computer including a processor, the aggregate data being subsequently utilized in on-going gameplay to determine an outcome of an event or an action taken by a player during the game;
  generating, by the computer, a reference distribution parameter in connection with the population contingency, the reference distribution parameter comprising a statistical or other mathematical transformation of the aggregate data;
  using at least one processor to execute a linking function in order to dynamically resolve the event or action outcome, the event or action and the reference distribution parameter comprising inputs for the linking function;
  storing game data in a data storage system, wherein the game data includes at least one or more of the population contingency, the reference distribution parameter, and the linking function, the reference distribution parameters being stored in a database of a computer and being updated by the computer at periodic intervals; and
  facilitating the exchange of game data between an individual player and the data storage system.

2. The method of claim 1, wherein the population contingency is defined by at least one event in the virtual game, one or more possible outcomes in the virtual game, and a linking function.

3. The method of claim 1, wherein the population contingency is evaluated on a game host server.

4. The method of claim 1, wherein two or more reference distributions are used to resolve a single game action.

5. The method of claim 1, wherein an outcome of the player action is determined by evaluating the player action with respect to the reference distribution.

6. The method of claim 1, wherein the method utilizes aggregate population data to determine weighting of a particular game action.

7. The method of claim 6, wherein aggregate population data comprises at least one of any information obtained from a player engaged in the game, played supplied information, information queried from the player engaged in the game, and choices or actions made by the player.

8. The method of claim 1, wherein more than one reference distribution parameters are stored in a repository.

9. The method of claim 1, wherein the reference distribution is determined by querying the data storage system.

10. The method of claim 1 further comprising the steps of monitoring and updating the reference distribution.

11. The method of claim 10, wherein the reference distribution is updated dynamically.

12. A computer implemented method for a game having at least one component that is outcome dependent on updating player population data, comprising:
   establishing a population of players;
   collecting at least one element of player information from the population of players to compile aggregate player population data, wherein the game is hosted by a computer system that stores aggregate player population data in a data storage system;
   defining at least one statistical reference distribution or a structured query for at least one computer including a processor to generate an at least one statistical reference distribution to be extracted from the aggregate population data, wherein the at least one statistical reference distribution or the structured query is stored in at least one database of the at least one computer;
   constructing a linking function that determines a relationship between an individual player gameplay and the at least one reference distribution to determine at least one gameplay outcome of the individual player;
   executing, by at least one computer, the linking function using the reference distribution and individual player gameplay as dynamic inputs to determine individual players' outcomes based on the aggregate player population data;
   updating the at least one database with the aggregate player population data and the at least one reference distribution for additional evaluations of successive player gameplay inputs; and
   using at least one screen to display at least one individual player gameplay outcome during the course of the game.

13. The method of claim 12, wherein the individual player gameplay comprises a player action initiated by the player.

14. The method of claim 12, wherein the individual player gameplay comprises player information extracted from the player by the game.

15. The method of claim 12, wherein the gameplay outcome comprises at least one of ranking the individual players, a win or loss outcome of the individual players, or a life or death result of one of the individual players.

16. The method of claim 12, wherein the updating step is performed continuously.

17. The method of claim 12, wherein the updating step is performed following a delay period.

18. The method of claim 12, wherein the linking function comprises at least one of a mean function, a frequency function, a probability function, or combinations thereof.

19. The method of claim 12, wherein the individual player comprises a team of individual players.

20. A system comprising:
   at least one processor of a machine; and
   a game networking system comprising at least one computer including a processor, the computer in communication with at least one database, configured to:
   establish a population of players;
   query multiple players on a selected topic;
   collect player responses to assemble aggregate response data;
   extract one or more statistical reference distributions from the aggregate response data;
   define a linking function that determines a relationship between individual player input and the one or more reference distributions to determine at least one gameplay polling outcome of individual players;
   apply the linking function and reference distribution to individual player input to determine individual players' polling outcomes based on the aggregate response data;
   update the aggregate population data and associated reference distributions dynamically store in the database for successive evaluations of successive player inputs; and
   display at least one individual player gameplay polling outcome during the course of the polling game.

* * * * *